United States Patent [19]

Pirbazari et al.

[11] Patent Number: 4,956,093
[45] Date of Patent: Sep. 11, 1990

[54] WASTEWATER TREATMENT PROCESS

[76] Inventors: Massoud Pirbazari, 11634 Gorham Ave., #101, Los Angeles, Calif. 90089; Jacob Shorr, 56 Liberty Ave., Lexington, Mass. 02173

[21] Appl. No.: 178,189

[22] Filed: Apr. 6, 1988

Related U.S. Application Data

[63] Continuation-in-part of Ser. No. 899,416, Aug. 22, 1986, abandoned.

[51] Int. Cl.⁵ .............................................. C02F 3/08
[52] U.S. Cl. .................................. 210/616; 210/631; 210/650
[58] Field of Search ............... 210/616, 729, 618, 623, 210/631, 638, 639, 650, 651, 694

[56] References Cited

U.S. PATENT DOCUMENTS

| | | | |
|---|---|---|---|
| 3,490,590 | 1/1970 | Davies | 210/616 |
| 3,904,518 | 9/1975 | Hutton et al. | 210/616 X |
| 4,173,532 | 11/1979 | Keoteklian | 210/727 X |
| 4,200,524 | 4/1980 | Levin | 210/616 |
| 4,566,971 | 1/1986 | Reimann et al. | 210/616 |
| 4,582,607 | 4/1986 | Kiese et al. | 210/612 |

Primary Examiner—Tom Wyse
Attorney, Agent, or Firm—Hale and Dorr

[57] ABSTRACT

A wastewater treatment system in which biologically active particulate material mixed with wastewater is recirculated under turbulent conditions. The biomass is maintained at high concentration, and recirculation of the particles maintains the biological layer on the particles at a more active and efficient state would be the case without such recirculation. The system is particularly efficient, especially when the organic waste materials are slowly or relatively non-biodegradable, when the particulate material is adsorbtive (as, for example are particles of activated carbon) and the recirculation system includes an ultrafilter. When combined with a pretreatment of either alum or ferric chloride with lime, the system is particularly suited for efficient and effective treatment of dairy wastes.

2 Claims, 1 Drawing Sheet

WASTEWATER TREATMENT PROCESS

This application is a continuation-in-part of Ser. No. 899,416, filed Aug. 22, 1986, now abandoned.

This invention relates to the treatment of wastewater, and more particularly to a process for treating of organic wastes.

BACKGROUND OF INVENTION

In recent years, environmental standards have markedly affected the requirements for wastewater treatment. Effluent standards have become more stringent, and it also has become important to develop wastewater treatment processes that are capable of providing wastewater suitable for reuse.

The problems of wastewater treatment have been particularly important, for example, in the dairy industry and in the treatment of leachates from hazardous wastewater impoundments and waste disposal sites. The nation's dairy plants process billions of pounds of milk annually, and the processing of such large volumes of material inevitably produces a large volume of waste that includes an extremely high level of organic compositions. Leachates from hazardous waste contain many priority pollutants, both inorganic and organic. The Environmental Protection Agency has estimated that from 41 to 57 million metric tons of industrial hazardous waste are produced each year and that some 32,000 to 50,000 wastewater impoundments and waste disposal sites in the United States produce leachate, which can cause major groundwater contamination.

Existing processes for the treatment of organic wastes have significant drawbacks, particularly with respect to the removal of organic substances which are non-biodegradable or which biodegrade slowly. In the United States, the predominant method of biological treatment is through use of activated sludge, but biological treatment processes are relatively inefficient, produce a large volume of sludge that must be disposed of, and frequently do not meet current waste quality discharge requirements for the removal of non-biodegradable or slowly biodegradable organic substances. Physiochemical processes, such as activated carbon adsorption, have been designed to remove non-biodegradable or slowly biodegradable organic compounds, but are energy and operating cost intensive.

A paper, entitled "Powdered Activated Carbon Treatment (PACT ™) of Leachate from the Stringfellow Quarry" and presented at an EPA Research Symposium at Cincinnati, Ohio on about Apr. 30, 1985, discusses treatment of a high priority wastewater leachate containing halogenated and non-halogenated volatile organics as well as heavy metals, by first pretreating the waste by lime precipitation to remove heavy metals and then treating the settled wastewater in the aeration tank, to which activated carbon had been added, of a generally conventional activated sludge system. This system is said to present several advantages over conventional activated sludge processes, but considerable further improvement is still desirable.

SUMMARY OF INVENTION

We have discovered that an effluent of higher quality than that normally obtained by prior treatment systems can be obtained more efficiently by providing a system in which biologically active particulate material mixed with wastewater is recirculated under turbulent conditions. The biomass may be maintained at a far higher concentration than in prior art systems, and recirculation of the particles has been found, unexpectedly, to maintain the biological layer on the particles at a more active and efficient state would be the case without such recirculation.

We have found also that such a system is particularly efficient, especially when the organic waste materials are slowly or relatively non-biodegradable, when the particulate material is adsorbtive (as, for example are particles of activated carbon) and the recirculation system includes an ultrafilter. When combined with a pretreatment of either alum or ferric chloride with lime, the system is particularly suited for efficient and effective treatment of dairy wastes, which in the past have required long hydraulic detention time and caused significant operating problems.

One aspect of the present invention thus features a process for treating wastewater that includes waste organic compounds that includes the steps of mixing biologically active particles (e.g., particles carrying on the outer surfaces thereof a biomass layer including bacteria that is biologically reactive with at least some of the organic compounds in the wastewater) with wastewater in a wastewater tank having an outlet and a recirculation loop connected to the outlet and arranged to withdraw liquid wastewater from the tank and pass the liquid through the loop and reintroduce at least a fraction of the withdrawn liquid back into the tank, and circulating the wastewater and biologically active material mixed therein through the recirculation loop under turbulent flow conditions thereby to maintain the biological layer on the particles at a thickness such that the layer is biologically active. In preferred practices of this aspect of the invention, the particulate material is adsorbtive, e.g., is powdered activated carbon or some other material having interior pores which adsorb organic waste materials and thereby maintain the waste adjacent the bacteria with which it reacts, a membrane filter placed in the recirculation loop retains particulate material and biomass in the loop and tank while passing permeate, the thickness of the biofilm on the particles is not more than about 20 (and preferably about 2-10) microns, and the concentration of each of the biomass and particulate material in the recirculation loop and tank is not less than about 10,000 ppm.

A second aspect of the invention features, in a wastewater treatment process in which the wastewater is treated by mixing it with chemical coagulants to precipitate or otherwise remove waste materials from the wastewater, that improvement wherein the chemical coagulants mixed with the wastewater comprise lime and either alum or ferric chloride. In a preferred practice of this second aspect to pretreat dairy waste, the lime is mixed with the wastewater at a concentration in the range of about 500–700 mg/l and the alum or ferric chloride is mixed with the wastewater at a concentration in the range of about 700 to 1000 mg/l.

Other objects, features and advantages will appear from the following detailed description of a preferred embodiment of the invention, taken together with the attached drawing in which.

DETAILED DESCRIPTION

Figure 1:
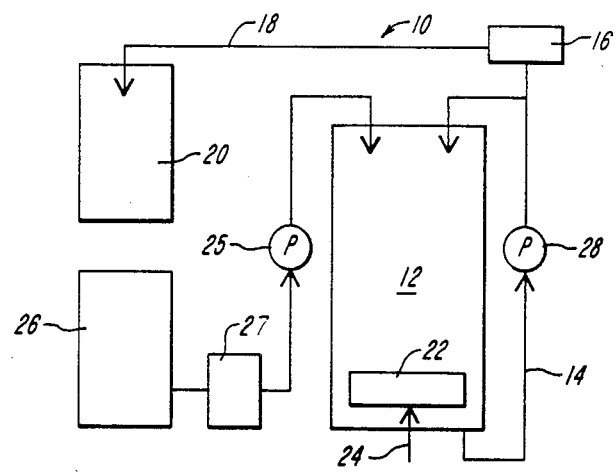
FIG. 1 is a schematic illustrating the practice of the present invention.

Referring now to FIG. 1, there is shown a waste treatment system, generally designated 10, comprising an aeration/recirculation tank 12, a recirculation loop 14 having its inlet connected to tank 12 adjacent the bottom thereof and its outlet discharging into the top of tank 12, and a filter 16 in a permeate outlet line 18 extending from recirculation loop 14 to permeate tank 20. An aerator 22 is provided at the bottom of recirculation tank 12 and is connected by air line 24 to a compressed air source.

In practice, an initial step of the wastewater treatment process of the present invention is to provide, in recirculation tank 12, a desired concentration of biologically active particulate material, i.e., a particles that have on the outer surfaces thereof a thin layer of biologically active material (e.g., an active "biofilm") that will react with organic compounds in the wastewater. To form the desired active biofilm, pump 25 pumps settled wastewater (the waste content of which is typical of the waste water to be treated) from a settled waste water tank 26 into recirculation tank 12. The wastewater flows through a pH adjustment tank 27 where its pH it adjusted to about 7. A bacterial source, e.g., a mass of bacteria of sewage origin, is added to the pH adjusted waste water in tank 12, and the bacteriawastewater mixture is then aerated to acclimate the bacteria (e.g., to grow selectively from the bacterial source a biomass which will react with the organic compounds in the waste) in the conventional manner. Particulate material, such as bentonite clay (e.g., smaller than about 200 mesh sold by Industrial Ventures Inc. of Las Vegas, Nevada under the IGBA brand), powdered activated carbon (e.g., about 325 mesh having a surface area of about 475–1000 square meters per gram sold by ICI Americas, Inc.), silicon dioxide powder (e.g. smaller than about 120 mesh sold by Pittsburgh Glass Sand Corp. under the brand "Min-U-Sil"), or the like is then added to the recirculation tank. As aeration continues the biomass continues to acclimate and grow, creating a thin layer of biologically active bacteria (e.g., a "biofilm") on the outer surfaces of the particulate material. Herein, such particulate material with the active biofilm thereon is referred to as "biologically active particulate material."

Typically, acclimation is permitted to continue until the biomass (both the biomass that forms the biofilm of the biologically active particulate material and unattached biomass elsewhere in the recirculation tank) reaches a desired concentration.

When the biomass concentration has reached the desired concentration, and acclimation is complete, pump 28 is started to commence recirculation of the wastewater and biologically active particulate material suspended therein through recirculation loop 14. After a suitable hydraulic detention time (which is determined by sampling the wastewater and measuring its TOC), continuous waste treatment commences. During continuous treatment, the rates (GPD) at which settled wastewater is added to recirculation tank 12 from settled wastewater tank 26 and treated water or permeate is removed from the recirculation loop 14 through filter 16 are the same. As will be apparent, filter 16 retains the biologically active particulate material in the recirculation loop.

The system of the present invention is extremely flexible, and can be used with a wide range of concentrations of particulate material and biomass. One of its principal advantages, however, is that because the system of the present invention produces a permeate by filtering the wastewater with the particulate material suspended, rather than by settling as in conventional activated sludge systems, it is able to operate with very high concentrations of both biomass and particulate material. In typical practice of the invention, the concentration at which particulate material is initially added to the recirculation tank is not less than about 10,000 to 20,000 ppm (i.e., 1 to 2 wt.%), and the concentration of the acclimated biomass also is typically not less than about 10,000 ppm. The ability to operate with such an increased biomass concentration in and of itself significantly increases the efficiency of the wastewater treatment system.

Additionally, it has been found that recirculation of the biologically-active particulate material results in a significant further, and unexpected, increase in efficiency. In a biologically active waste treatment system, supported biomass, such as that forming the biofilm on the particles, reacts much more efficiently with organic wastes than does "free" bacteria or biomass in the wastewater. Recirculation of the biologically active particulate material has been found to prevent the biofilm from growing too thick; it causes the biofilm to be maintained at a thickness significantly less (e.g., less than about 10–20 microns, and typically as thin as about 2 microns) than that which would build up without absence of such recirculation (e.g. not less than about 20 to 40 microns). A thin film remains metabolically active; a significant portion of a thicker film (such as would build up on non-circulating carbon particles) does not.

Further, when an adsorbtive particulate material, e.g., particulate material having an activated surface such as powdered activated carbon, is used, organic compounds are adsorbed by the particulate material, and are thus held in close proximity to the layer of active biological material, i.e., the "biofilm", on the surface of the particles. This is particularly important when the biologically active system is used to treat relatively inactive organic waste materials such as phenols (e.g., catechol or paranitrophenol) or chlorinated compounds (e.g., benzene). With a thick film, such as will grow on the outer surface of the particles without turbulent recirculation, the film in contact with any adsorbed materials will be far less active. Also, the oxygen and water produced by reaction of the adsorbed waste materials with the thin active biofilm on the recirculating particles of the present invention are able to transport outwardly through the thin film, and new organic materials are able to transport inwardly and be adsorbed in their place. With a thicker film, far less transport is able to take place.

In small scale systems incorporating the present invention, e.g., in systems in which the diameter of the pipes of the recirculation loop 14 is about 1 inch, the Reynolds number of the turbulent waste water flow in the recirculation loop 14 is greater than about 20,000; in larger operating systems, e.g., systems in which the pipe has a larger diameter, the Reynolds number of the flow may range from about 65,000 to more than 100,000. The relatively high velocities and turbulence associated with such Reynolds numbers help insure the conditions that maintain the biofilm at the desired less than 20 microns (and preferably in the range of about 2 to about 10 microns) thickness.

Figure 2:
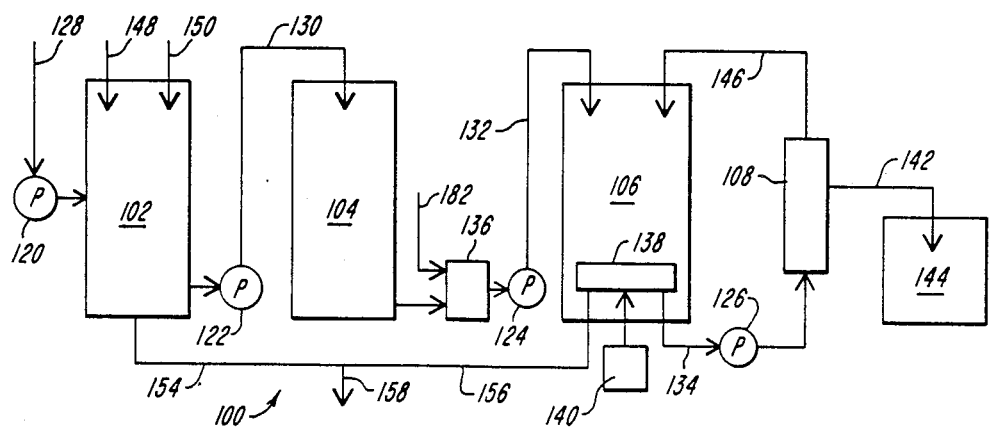
FIG. 2 is a schematic of a waste treatment system used in a preferred practice of the present invention; and, FIG. 3 is a sectional view of an ultrafilter used in the system of FIG. 2 and useful with the system of FIG. 1.
Figure 3:
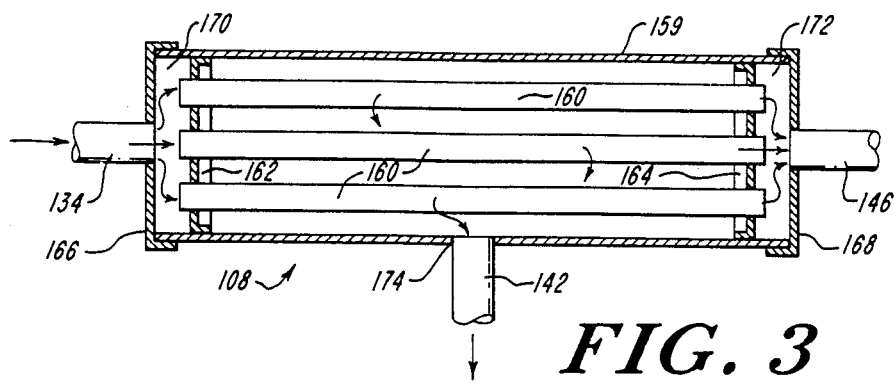

FIGS. 2 and 3 illustrate a preferred waste treatment system, generally designated 100, constructed according to the present invention and particularly useful in, e.g., the treatment of dairy waste. As shown system 100 includes a chemical pretreatment tank 102, a settled wastewater holding tank 104, a recirculation tank 106 which receives wastewater from holding tank 104, and a filtration unit 108. In the preferred embodiment shown, filtration unit 108 is a membrane filtration unit of the type now being offered for sale by Memtek Corporation of Billerica, Massachusetts. Although only a single membrane filtration unit 108 is shown, typically a number of units will be provided, connected in parallel with each other. Pumps, designated 120, 122, 124, and 126, respectively are provided in the inlet line 128 to chemical pretreatment tank 110, the line 130 from near the bottom of chemical pretreatment tank 102 to settled wastewater holding tank 104, the line 132 from adjacent the bottom of tank 104 to the top of recirculation tank 106, and in the inlet line 134 from the bottom of recirculation tank 106 to membrane filtration unit 108. A relatively small pH adjustment tank 136 is provided in line 132 between tank 104 and pump 124, and an aerator 138 within and at the bottom of recirculation tank 106 is connected to a source of compressed air or oxygen 140. The filtrate/permeate from membrane filtration unit 108 flows through outlet line 142 to permeate holding tank 144; the concentrate from unit 108 is passed through recirculation line 146 back into the top of recirculation tank 106.

Pretreatment chemicals are added to pretreatment tank 102 through, for example, pretreatment inlets 148, 150, and a pH adjuster (such as $H_2SO_4$) is added to pH adjustment tank 136 through inlet 152. Concentrated sludge may be removed from the bottom of pretreatment tank 102 through drain line 154 and from the bottom of recirculation tank 106 through drain line 156, both of the drain lines being connected to a common drain 158.

Membrane filtration unit 108 (shown most clearly in FIG. 3) includes a PVC housing 159 in which are mounted a number, typically 10, of coaxial membrane tubes 160. The tubes 160, each of which comprises an inert synthetic anisotropic membrane cast onto the inside of a tubular porous support tube, are supported within the housing by circular supports 162, 164 each of which includes a number of spaced holes supporting and sealingly engaging the exterior of the membrane tubes. The two ends of the housing are covered by end caps 166, 168, each of which includes a coaxial opening sealingly supporting a respective one of inlet line 134 and recirculation line 146. An inlet chamber 170 and outlet chamber 172 are provided at the opposite ends of housing 159, between the respective end cap and tube support. The open ends of the membrane tubes communicate with the inlet and outlet chambers. Filtrate/permeate outlet 174, to which line 142 is connected, is provided in the cylindrical wall of housing 159, midway its length. The effective size of the pores of the membrane depends on the particular material t be removed by filtration. The membrane units of the preferred embodiment, manufactured and sold by Memtek Corporation, typically have an effective pore diameter of 0.01 to 0.1 micron.

In the treatment of wastewater from a dairy plant according to the present invention, the raw wastewater is pumped into chemical pretreatment tank 102 through inlet line 128. Dairy wastewater is principally composed of fats, protein, glucose, lactose and carbohydrates from processing, and acids, bases and detergents from cleaning and sanitizing materials. It is, thus, largely organic, a mixture of readily biodegradable and refractory chemicals, e.g., detergent. The wastewater typically is very strong (e.g., a typical $BOD_5$ value of 2000 mg/l) compared to domestic sewage (e.g., a typical $BOD_5$ value of about 200 mg/l), and its strength and flow rate vary widely on a daily and seasonal basis. Typical $BOD_5$:COD and TOC:$BOD_5$ ratios are in the range of 0.5 to 0.6, and 0.4 to 0.5, respectively (e.g., COD:$BOD_5$:TOC is about 4:2:1); and the pH and TOC typically may vary from 8 to 11.5 and from 200 to 1400 mg/l, respectively, during a day's operation.

The raw wastewater in tank 102 is treated with a combination of lime (concentration 500–700 mg/l) and either alum (e.g., aluminum sulfate, $Al(SO_4)_2$) or ferric chloride ($FeCl_3$) (either at a concentration of 700–1000 mg/l). The pretreatment chemicals are introduced into tank 102 through respective ones of inlets 148, 150 and are thoroughly mixed with the raw wastewater in tank 102, typically by rapid mixing, followed by slow mixing and settling. The precipitate (lime-alum or lime-ferric chloride) in chemical pretreatment tank 102 forms a sludge at the bottom of the tank and, as it builds up, is removed through drain 154. The sludge is in the form of a semi-solid liquid and, after removal from tank 102, may be settled and filtered for eventual disposal. The wastewater from tank 102 is pumped into settled wastewater tank 104.

Using either the lime-alum or the lime-ferric chloride pretreatment, the TOC of the waste in pretreatment tank 102 is reduced by about 50%. The $BOD_5$ and COD are similarly decreased, the $BOD_5$ and COD of the influent to tank 102 being about twice that of the effluent to settled wastewater tank 104.

Although lime is less efficient than alum or ferric chloride as a coagulant in removing dissolved organics, and also has a tendency to form non-settable lime flocs when used with dairy wastewater, it is effective in adjusting the pH of the wastewater. The use of either alum or ferric chloride alone would reduce pH to a level that, as discussed hereinafter, is lower than desired. The use of lime in conjunction with alum or ferric chloride insures that the pH is maintained at a relatively high level, which both causes precipitation of heavy metal ions and retards bacterial growth. Desirably, the pH of the wastewater in tank 102 is above about 9 and, preferably, about 11 or 12.

Since dairy wastewater is biodegradable, the characteristics of the wastewater will change with time. To preserve the settled wastewater, microbial growth in tanks 102 and 104 must be inhibited. Significant growth of bacteria can generally be prevented by temperatures either below about −5 or above about 80 degrees Centigrade, or by pH lower than about 4 or above about 9. In the practice of the present invention, microbial growth in settled waste water in tank 104 is most efficiently inhibited by the high pH provided by the lime used in pretreatment. It has also been found that increased pH also increases the adsorption capacity of the particulate activated carbon with which the wastewater is mixed in tank 18.

Settled waste water in tank 104 passes into pH adjustment tank 136, where its pH is adjusted to about 7.0 by the addition of sulphuric acid through inlet 152, and then is pumped into recirculation tank 106.

In recirculation tank 106, the waste water is mixed with biologically active powdered activated carbon (or with a biologically active particulate material comprising some other finely divided particulate, and preferably adsorbtive, material) at a high concentration of both particulate material and biomass. As previously discussed, the biologically active particulate material is created by growing a biofilm on the surface (preferably the activated surface) of the particulate material, the particulate material itself typically having been provided in the recirculation tank at a concentration of 1-2 wt.%). During acclimation and subsequent biomass growth, air is introduced into the recirculation tank 106 through aeration diffuser 138 to mix and aerate the wastewater, and the system is maintained at a temperature (about 88° F.), pressure (about 20 PSI), oxygen concentration about 3-4 mg/l) and pH (about 7) that enhance biomass growth. The particulate material/biological solids concentration is allowed to build up, e.g. for a period of about 5-6 days, until the biomass in the tank reaches a concentration level of not less than about 10,000 ppm. The activated surface of adsorbtive material, such as powdered activated carbon, enhances the multiplication rate of the biota population in the system and reduces start-up and hydraulic detention time; an oxygen concentration of 3-4 mg/l is also desirable for high TOC removal and short hydraulic detention time.

Biological growth often can be further enhanced by adding nitrogen compounds (e.g., ammonium hydroxide) and, in some circumstances, potassium compounds (e.g., potassium phosphate) to the wastewater in tank 106 to insure that the presence of sufficient nitrogen and phosphorous nutrients for good operation of the biological treatment system.

When the biomass has developed to the desired concentration (e.g., the desired food to microorganism ratio), the wastewater, particulate material/biological solid mass in the recirculation tank are circulated under pressure through membrane filtration unit 108, the flow being such as to cause a turbulent flow regime. The permeate, essentially water, passes radially through the membrane tubes 160 and is discharged through outlet line 142 into permeate tank 142. The suspended materials (e.g., the biologically active particulate material and biological solids, together with other suspended contaminants) do not pass through the membranes and are returned to recirculation tank 106 through recirculation loop 146. The TOC level in the permeate has been found to be only about 3% of that in the influent from settled wastewater from tank 104, which itself has a TOC level about 50% less than that in the raw wastewater from the dairy plant in tank 102.

It has been found that the relatively high circulation velocities, which of course result in a relatively high superficial velocity across the membrane, reduce concentration polarization effect, cake formation and fouling of the membranes, and thus increase the flux rate (GFD) through the membranes. Typical flux rates obtained have been in the range of 20 to 30 GFD.

It also has been found that the particulate material which carries the biofilm provides a number of advantages. In addition to supporting microbial growth (and also adsorbing organic wastes when the particles are an adsorbtive material having an activated surface), the particulate material added to the settled wastewater in recirculation tank 106 acts as a filter aid that enhances filtration flow rates across and prevents fouling of the ultrafilter membranes, prevents pollution of the effluent until the biomass has developed to the point where it can effectively biodegrade the pollutants, and acts as a catalyst to enhance the multiplication rate of the biota population in the system.

To maintain continuous flux and TOC removal, particulate material may be continuously added to, and old particles and biomass removed, from the recirculation system. Without such replenishing, flux rates in some systems may decline, and permeate TOC levels may increase, with time. Where replenishment is required, the overall concentration of particulate material in the recirculation system is maintained at a desired level, e.g., in the range of 1 to 2 wt%.

Other embodiments will be within the scope of the following claims.

What is claimed is:

1. A process for treating wastewater including waste organic materials, said process comprising the steps of:
   providing biologically active powdered activated carbon particles carrying on the outer surfaces thereof an active biological layer including bacteria that is biologically reactive with and biodegrades at least some of said organic compounds;
   mixing said biologically active activated carbon with said wastewater in a tank having an outlet and a recirculation loop having an isotropic membrane filter arranged to retain said particulate material in the portion of said wastewater recirculated and turned to said tank, and to pass a filtered parmeate, said loop connected to said outlet and arranged to withdraw liquid from said tank, pass said liquid through said loop, and introduce at least a fraction of said withdrawn liquid back into said tank; and,
   circulating said wastewater and said biologically active activated carbon through said loop under turbulent flow conditions thereby to maintain said biological layers on said particles at mean thicknesses less than about 20 microns.

2. A process for treating wastewater including waste organic compounds, said process comprising the steps of:
   providing biologically active absorbtive powdered activated carbon particles in a concentration in said recirculating wastewater of at least 10,000 ppm, carrying on the outer surfaces thereof an active biological layer of a mean thickness on said carbon particles maintained at less than 20 microns, said layer including bacteria that is biologically reactive with and biodegrades at least some of said organic compounds, said bacteria in a concentration in said recirculating wastewater of at least 10,000 ppm;
   mixing said biologically active absorbtive powdered activated carbon with said wastewater whereby said powdered activated carbon absorbs organic compounds in said wastewater;
   circulating said wastewater with said biologically active absorbtive powdered activated carbon mixed therein from a tank through a recirculation loop arranged to withdraw liquid from said tank, pass said liquid through said loop and reintroduce at least a fraction of said withdrawn liquid back into said tank;
   providing in said recirculation loop an isotropic membrane filter arranged to retain said particulate absorbtive material in the portion of said wastewater recirculated and returned to said tank and to pass a filtered permeate; and controlling said circulating of said wastewater and said biologically active powdered activated carbon to provide turbulent flow conditions in said loop thereby to maintain the biological layer on said carbon particles at a thickness such that said layer is biologically active and reacts with organic materials absorbed by said carbon particles.

* * * * *

UNITED STATES PATENT AND TRADEMARK OFFICE
CERTIFICATE OF CORRECTION

PATENT NO. : 4,956,093
DATED : September 11, 1990
INVENTOR(S) : Massoud Pirbazari et al It is certified that error appears in the above—identified patent and that said Letters Patent is hereby corrected as shown below:

In Claim 1, at column 8, line 31, "parmeate" should be --permeate--.

In Claim 2, at column 8, line 45, "absorbtive" should be --adsorbtive--.

In Claim 2, at column 8, line 55, "absorbtive" should be --adsorbtive--.

In Claim 2, at column 8, line 57, "absorbs" should be --adsorbs--.

In Claim 2, at column 8, line 60, "absorbtive" should be --adsorbtive--.

In Claim 2, at column 8, lines 67-68, "absorbtive" should be --adsorbtive--.

Signed and Sealed this

Seventeenth Day of December, 1991

*Attest:*

HARRY F. MANBECK, JR.

*Attesting Officer*  *Commissioner of Patents and Trademarks*